United States Patent
Vinnakota et al.

(10) Patent No.: US 7,162,564 B2
(45) Date of Patent: Jan. 9, 2007

(54) CONFIGURABLE MULTI-PORT MULTI-PROTOCOL NETWORK INTERFACE TO SUPPORT PACKET PROCESSING

(75) Inventors: Bapiraju Vinnakota, Fremont, CA (US); Jonathan W. Liu, Campbell, CA (US); Saurin Shah, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 10/190,851

(22) Filed: Jul. 9, 2002

(65) Prior Publication Data

US 2004/0010650 A1   Jan. 15, 2004

(51) Int. Cl.
  *G06F 17/10*  (2006.01)
  *G06E 1/00*  (2006.01)
  *G06F 1/02*  (2006.01)
(52) U.S. Cl. .................. 710/308; 710/22; 709/250
(58) Field of Classification Search ............... 710/308, 710/22; 709/244, 250
See application file for complete search history.

(56) References Cited

U.S. PATENT DOCUMENTS

| | | | | |
|---|---|---|---|---|
| 5,764,896 | A * | 6/1998 | Johnson | 709/250 |
| 6,101,553 | A * | 8/2000 | Greatwood et al. | 709/250 |
| 6,105,079 | A * | 8/2000 | Kuo et al. | 710/25 |
| 6,154,796 | A * | 11/2000 | Kuo et al. | 710/52 |
| 6,240,095 | B1 * | 5/2001 | Good et al. | 370/412 |
| 6,327,271 | B1 | 12/2001 | Gotesman et al. | |
| 6,389,479 | B1 * | 5/2002 | Boucher et al. | 709/243 |
| 6,516,371 | B1 * | 2/2003 | Lai et al. | 710/305 |
| 6,651,107 | B1 * | 11/2003 | Conley et al. | 709/250 |
| 6,721,872 | B1 * | 4/2004 | Dunlop et al. | 712/28 |
| 6,766,389 | B1 * | 7/2004 | Hayter et al. | 710/62 |

FOREIGN PATENT DOCUMENTS

EP    0498201    8/1992

OTHER PUBLICATIONS

European Patent Office, International Search Report for International Application No. PCT/US 03/20888, 3 pages, Jul. 13, 2004.

* cited by examiner

*Primary Examiner*—Mark H. Rinehart
*Assistant Examiner*—Christopher Daley
(74) *Attorney, Agent, or Firm*—Erik R. Nordstrom

(57) ABSTRACT

A network interface between an internal bus and an external bus architecture having one or more external buses includes an external interface engine and an internal interface. The external interface engine (EIE) is coupled to the external bus architecture, where the external interface engine communicates over the external bus architecture in accordance with one or more bus protocols. The internal interface is coupled to the external interface engine and the internal bus, where the internal interface buffers network data between the internal bus and the external bus architecture. In one embodiment, the internal interface includes an internal interface (IIE) coupled to the internal bus, where the IIE defines a plurality of queues for the network data. An intermediate memory module is coupled to the IIE and the EIE, where the intermediate memory module aggregates the network data in accordance with the plurality of queues.

38 Claims, 4 Drawing Sheets

PRIOR ART

CONFIGURABLE MULTI-PORT MULTI-PROTOCOL NETWORK INTERFACE TO SUPPORT PACKET PROCESSING

BACKGROUND

1. Technical Field

Embodiments of the present invention generally relate to computer networking architectures. More particularly, embodiments of the invention relate to a network interface between a processor internal bus and an external bus that enables enhanced networking performance.

2. Discussion

Figure 1:
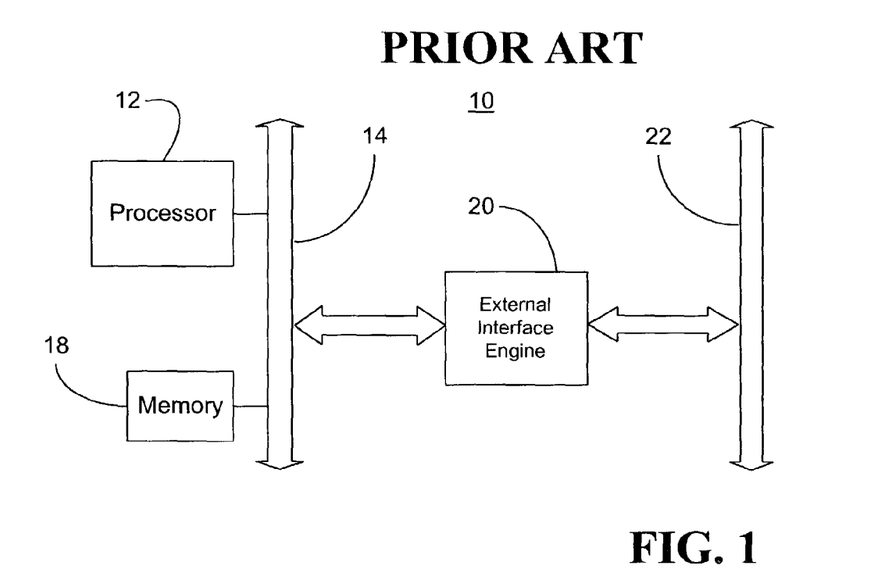
FIG. 1 is a block diagram of an example of a conventional networking architecture, useful in understanding the invention.

In the highly competitive computer industry, the trend toward faster processing and increased functionality is well documented. While this trend is desirable to the consumer, it presents a number of challenges to computer designs as well as manufacturers. One concern relates to networking architectures, particularly in view of the rapidly increasing popularity of the Internet in modern society. A typical networking architecture for a system-on-chip is shown in FIG. 1 at 10. It can generally be seen that a networking processor 12 is coupled to an internal bus 14 and typically has an internal memory 18. The memory 18 may be either on-chip or off-chip, and is also coupled to the internal bus 14, where the processor 12, memory 18 and internal bus 14 may be part of a "system-on-chip" (SOC). It can further be seen that the SOC also includes an external interface engine (EIE) 20 coupled to the internal bus 14 and an external bus 22. The external bus 22 supports a bus protocol such as the peripheral component interconnect (PCI version 2.2, PCI Special Interest Group) protocol, the universal test and operation physical interface for asynchronous transfer mode (Utopia Level 1/2/3, ATM Forum Technical Committee) protocol, and/or others as needed. Thus, the EIE 20 communicates over the external bus 22 in accordance with the applicable protocol, stores network data to memory 18 for use by the processor 12, and retrieves network data from memory 18 in order to implement various networking functions.

While the above-described architecture 10 has been satisfactory in certain networking environments, significant room for improvement remains. For example, the conventional EIE 20 operates as a single engine that is only capable of communicating in accordance with one external bus protocol. Thus, if it is desired to utilize multiple protocols, additional EIEs are necessary. Furthermore, if EIEs are added it is difficult to share physical resources across multiple logical queues according to user-determined priorities. This difficulty in assigning resources to the protocols results from the fact that there is no mapping of logical queues onto the multiple protocol interfaces.

In addition, various protocols often use different data ordering and arrangements. For example, some protocols may require a technique commonly referred to as endian-swapping in order to insure that the network data has the same "look and feel" regardless of the external bus protocol. It should also be noted that as bus protocols transition from one generation to the next, such as going from Utopia Level 2 to Utopia Level 3, it may be desirable to add interfaces to support the upgrade. In the conventional architecture 10, however, adding new interfaces can be difficult, and often alters the internal look and feel of the network data. Furthermore, such modifications can complicate processing.

It will be further be appreciated that the EIE 20 typically has no memory region and therefore lacks the ability to buffer the network data between the internal bus 14 and the external bus 22. This can be undesirable with regard to networking performance for a number of reasons. For example, internal data transport is not isolated from network transients resulting from network bursts and dry spells. In this regard, processing speed is usually equal to the average data arrival rate. Typically, the maximum rate on a line is significantly higher than the average arrival rate. Indeed, certain network processors 12 are designed to pass about 40 megabytes of information per second, whereas data throughput on the external bus 22 can reach speeds as high as 100 megabytes per second. Thus, internal transport latencies are not decoupled from external transport latencies, and the lack of an overflow capability can result in packets being dropped during network bursts.

It is important to note that the typical EIE 20 uses a read-write data transport scheme wherein data is written to the memory 18, and the processor 12 accesses the off-chip memory 18 via a read operation over internal bus 14. Read operations are more costly from a latency standpoint than write operations because the requestor of the data must often wait a number of cycles for the data to be returned. Furthermore, the number of cycles usually cannot be predicted with precision. As a result, efficiency may suffer. Furthermore, the EIE 20 is traditionally unable to provide for service prioritization, classification of traffic and amortization of data transport costs. As a result, more of the processing time available to processor 12 must be spent managing the network data and less time can be spent processing the actual packets in the network data.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 2:
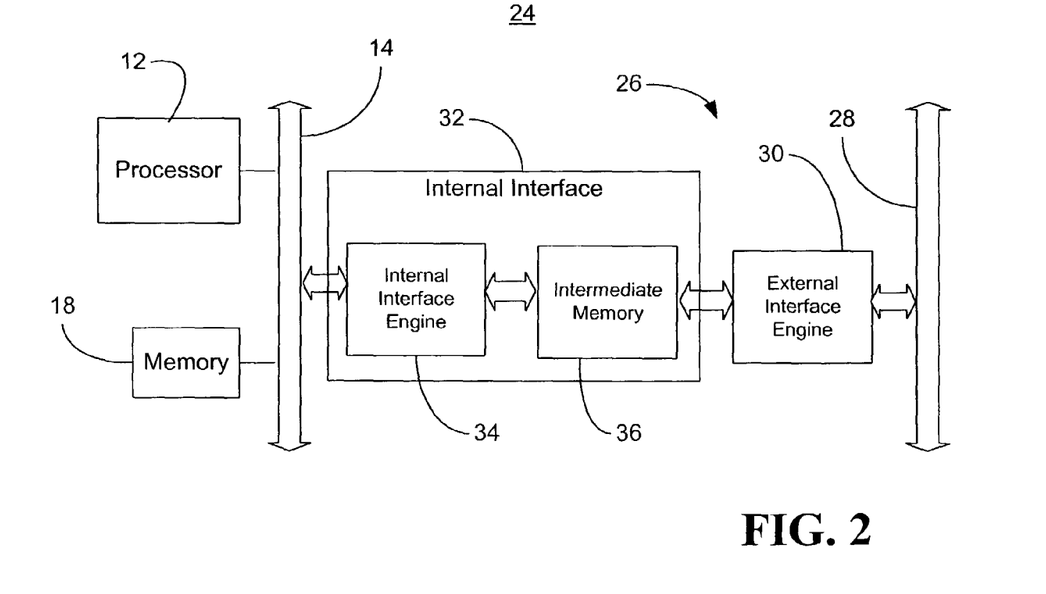
FIG. 2 is a block diagram of an example of a networking architecture in accordance with one embodiment of the invention.

Embodiments of the invention provide for significantly enhanced network performance. FIG. 2 shows a networking architecture 24 having a network interface 26 disposed between a processor internal bus 14 and an external bus architecture 28 having one or more external buses. One or more networking processors 12 and an internal memory 18 are coupled to the internal bus 14, as discussed above. The term "coupled" is used herein to indicate either direct or indirect connection, and may be implemented by any commercially available technique, be it electrical, optical, magnetic, mechanical, or any combination thereof. The external bus architecture 28 is capable of supporting a number of bus protocols such as the peripheral component interconnect (PCI) protocol and the universal test and operation physical interface for ATM (Utopia) Level 2 family of protocols. As will be discussed in greater detail below enabling the use of multiple bus protocols makes the network interface 26 much more robust than single bus approaches. While the network interface 26 will be primarily discussed with regard to the PCI and Utopia protocols, it should be noted that the embodiments of the invention are not so limited. Indeed, the network interface 26 is useful in any networking architecture in which network performance is an issue of concern. Notwithstanding, there are a number of aspects of these protocols for which the network interface 26 is uniquely suited.

It can generally be seen that the network interface 26 has an external interface engine (EIE) 30 and an internal interface 32. It is important to note that only a portion of the network interface 26 has to change in order to accommodate new protocols. Specifically, new interfaces can be readily added by adding EIEs 30. The EIE 30 is coupled to the external bus 28, where the EIE 30 communicates over the external bus architecture 28 in accordance with one or more bus protocols. The internal interface 32 is coupled to the EIE 30 and the internal bus 14, where the internal interface 32 buffers network data between the internal bus 14 and the external bus architecture 28. By buffering network data, a number of benefits can be achieved. For example, internal data transport can be isolated from transient network bursts/ dry spells in order to decouple internal transport latencies from external transport latencies. Furthermore, there are certain economies of scale that favor the aggregation of packets in the network data. A number of other benefits are also achieved as will be discussed herein.

More particularly, it can be seen that the internal interface 32 has an internal interface engine (IIE) 34 coupled to the internal bus 14, where the IIE 34 defines a plurality of queues for the network data. An intermediate memory module 36 is coupled to the IIE 34 and the EIE 30, where the memory module 36 aggregates the network data in accordance with the plurality of queues. The data from separate queues is segregated in independent buffers in the intermediate memory module 36.

Figure 3:
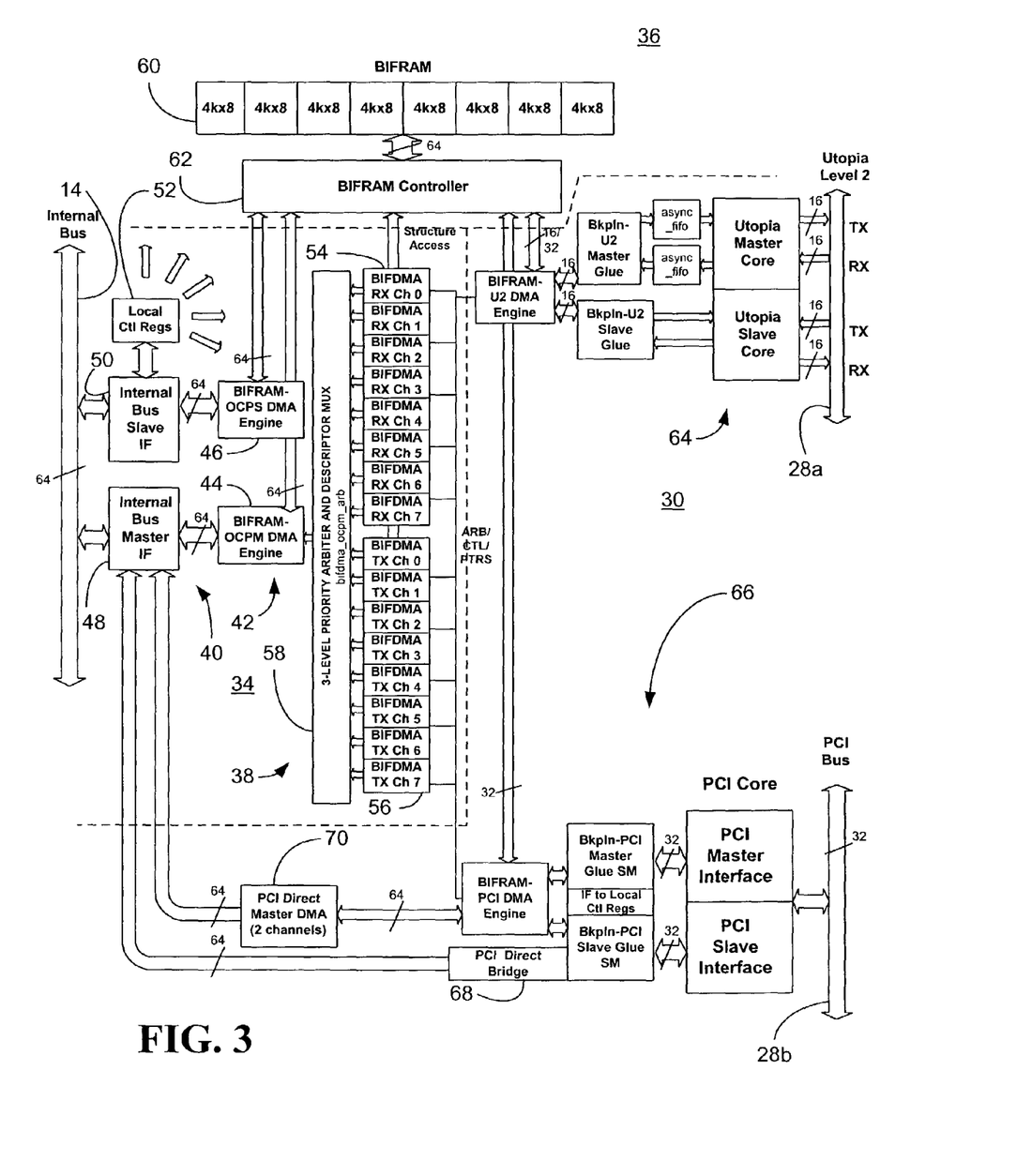
FIG. 3 is a block diagram of an example of a network interface in accordance with one embodiment of the invention.

Turning now to FIG. 3, it can be seen that the IIE 34 generally includes a multi-channel register structure 38 coupled to the EIE 30 and the intermediate memory module 36. It can further be seen that an internal bus interface architecture 40 is coupled to the internal bus 14. A backplane interface (BIF) direct memory access (DMA) engine architecture 42 is coupled to the internal bus interface architecture 40 and the intermediate memory module 36. The DMA engine architecture 42 enables the internal bus interface architecture 40 to transport the network data directly between the intermediate memory module 36 and a plurality of addressable locations via the internal bus 14. In particular, the interface architecture 40 is able to send data to, and receive data from the processor in addition to the internal memory.

Thus, network data is written to the intermediate memory module 36, and then written to either the internal bus 14 (if incoming) or to the external bus architecture 28 (if outgoing). The resulting data transport scheme can therefore be viewed as a "write-write" scheme as opposed to the more traditional "read-write" scheme in which data is written to the destination memory, and read by the processor in question. For example, conventional approaches to handling incoming data involve writing all network data to external or internal memory 18 (FIG. 1) regardless of whether memory 18 is the intended destination of the data. The processor 12 (FIG. 1) must then conduct a read operation in order to retrieve the data from memory 18. It is important to note that read operations consume considerably more processing time because the processor 12 must wait for the data to be returned from the memory 18. Furthermore, it is often difficult to predict how long the processor 12 will have to wait. Simply put, interface architecture 40 supports a "write-write" data transport scheme, which is significantly more efficient than traditional "read-write" schemes.

Specifically the DMA engine architecture 42 includes a master DMA engine 44 and a slave DMA engine 46. The master DMA engine 44 uses queue priority data from the register structure 38 to determine DMA setup information, such as source and destination address, direction, and DMA length, for the queues as they win priority. The master DMA engine 44 therefore determines which queue will be mastering the internal bus 14 and implements the direct memory access. The slave DMA engine 46, on the other hand, effectively allows the internal bus 14 to master the data transfer. Thus, the selected queue is a function of the encoding of the slave address, and is not determined by the arbitration taking place in the register structure 38. The internal and external engines can be independently configured to be masters/slaves on the receive and transmit paths. This permits the most bus-efficient configuration. For example, on data transmit from the device, the internal engine can be a slave and the external can be a master. The same is true for receiving data.

It can further be seen that the internal bus interface architecture 40 includes an internal bus master interface 48, an internal bus slave interface 50, and a plurality of local control registers 52 coupled to the internal bus slave interface 50. The local control registers 52 store data regarding the plurality of addressable locations and other handoff information.

In addition, the multi-channel register structure 38 has a set of receive queue registers 54 coupled to the EIE 30 and the memory module 36. A set of transmit queue registers 56 are coupled to the EIE 30 and the memory module 36, and control logic 58 is coupled to the receive queue registers 54 and the transmit queue registers 56 to prioritize the queues and define DMA setup information for the network data. Thus, the control logic 58 arbitrates among the queues and multiplexes the results as priorities are assigned.

It will be appreciated that the memory module 36 includes a random access memory (RAM) 60 and a RAM controller 62 coupled to the RAM 60, the EIE 30 and the IIE 34. The RAM controller 62 establishes buffer partitions based on the queues defined by the IIE 34. It is important to note that the buffer partitions are variable based on throughput requirements of the network data. By providing configurable partitions, a number of benefits can be obtained. For example, different classes of traffic can be transported and processed according to their distinct needs. This approach also enables the programmer to trade off processing/transport efficiency and data transport latency independently for different types of traffic. Furthermore, the DMA independent handoff mechanism enables several packets to be processed simultaneously in the packet core and the amortization of data transport costs.

It can further be seen that the EIE 30 includes a first external bus interface 64 and a second external bus interface 66. The first external bus interface 64 communicates over a first external bus 28a in accordance with a first bus protocol. In the illustrated example, the first bus protocol is the Utopia Level 2 protocol. The second external bus interface communicates over a second external bus 28b in accordance with a second bus protocol. In the illustrated example, the second bus protocol is the PCI bus protocol. By enabling the EIE 30 to operate in accordance with multiple external bus protocols and incorporating this functionality into the above-described configurable queue structure, a number of benefits can be achieved. For example, interfaces can be added without altering the internal look and feel of the network data and without unduly complicating processing. Furthermore, endian-swapping can be performed without having a negative software impact on the processor, and resource management is significantly easier to implement. In addition to endian-swapping, the EIE 30 can take data from interfaces from varying width and present it in one format inside the device. For example, Utopia is a 16-bit interface while the PCI is a 32-bit interface.

It should be noted that the second external bus interface 66 has a direct link with the internal bus master interface 48 in order to use the second external bus interface 66 as a host interface. In other words, the second external bus interface 66 interfaces to a host central processing unit (CPU), which configures and initializes the system and may perform call setup. In the direct bridge 68, the host CPU directly accesses the internal bus 14. In this mode, the direct bridge 68 acts as a slave on the external bus architecture 28 and a master on the internal bus 14. The direct master DMA 70 is a DMA engine, which copies data from the internal bus 14 to the external bus architecture 28, or vice versa, and acts as a master on both buses.

Figure 4:
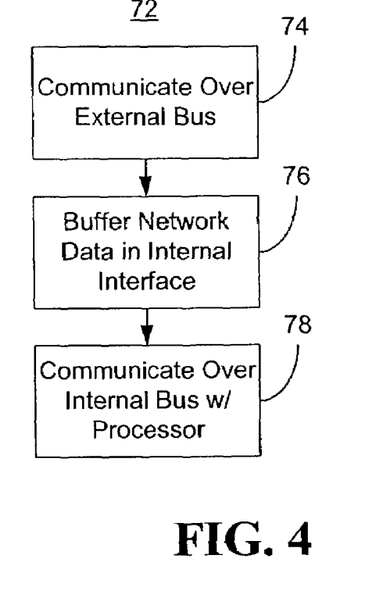
FIG. 4 is a flowchart of an example of a method of supporting transfer of network data in accordance with one embodiment of the invention.

Turning now to FIG. 4, a method 72 of supporting the transfer of network data between a processor internal bus and an external bus is shown for programming purposes. Generally, processing block 74 provides for communicating over the external bus in accordance with one or more bus protocols, and block 76 provides for buffering network data between the internal bus and the external bus and the internal interface. Block 78 provides for communicating over the internal bus with the processor in accordance with a processor handoff protocol. It should be noted that blocks 74 and 78 may be reversed to indicate internal bus-to external bus data transfer. It is also important to note that traditional approaches neither buffer the network data, nor communicate directly with the processor. Rather, it is common for the network data to be passed directly through the EIE, and written to internal memory. As a result, the processor must communicate over the internal bus to obtain the network data. The illustrated approach, on the other hand, enables network data to be sent directly to its final destination, i.e., the processor.

Figure 5:
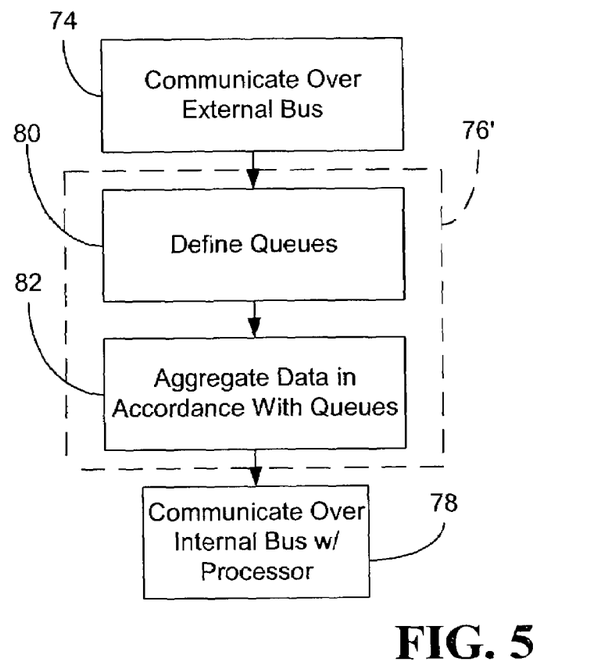
FIG. 5 is a flowchart of an example of a process of buffering network data in an internal interface in accordance with one embodiment of the invention.

Turning now to FIG. 5, one approach to buffering network data and the internal interface is shown in greater detail at block 76'. Specifically, it can be seen that a plurality of queues is defined for the network data at processing block 80. Block 82 provides for aggregating the network data in an intermediate memory module in accordance with the plurality of queues. Thus, where the network data includes a large number of packets, multiple packets can be accumulated in a given queue in order to take advantage of certain economies of scale when writing the packets to and reading the packets from the processor core.

Figure 6:
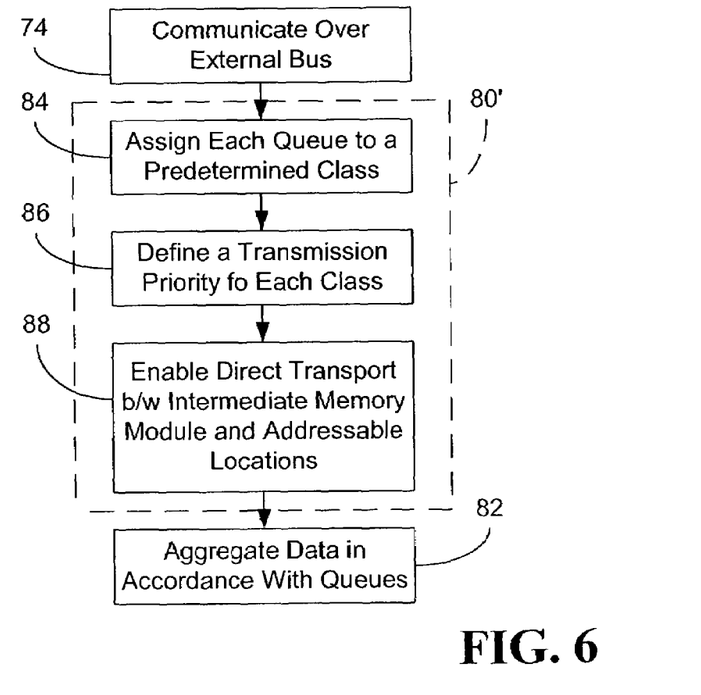
FIG. 6 is a flowchart of an example of a process of defining a plurality of queues for network data in accordance with one embodiment of the invention.

FIG. 6 shows one approach to defining the plurality of queues in greater detail at block 80'. Specifically, it can be seen that processing block 84 provides for assigning each queue to a predetermined class of network data. Block 86 provides for defining a transmission priority for each predetermined class. It can further be seen that block 88 provides for enabling the internal interface to transport the network data directly between the intermediate memory module and a plurality of addressable locations via the internal bus.

Figure 7:
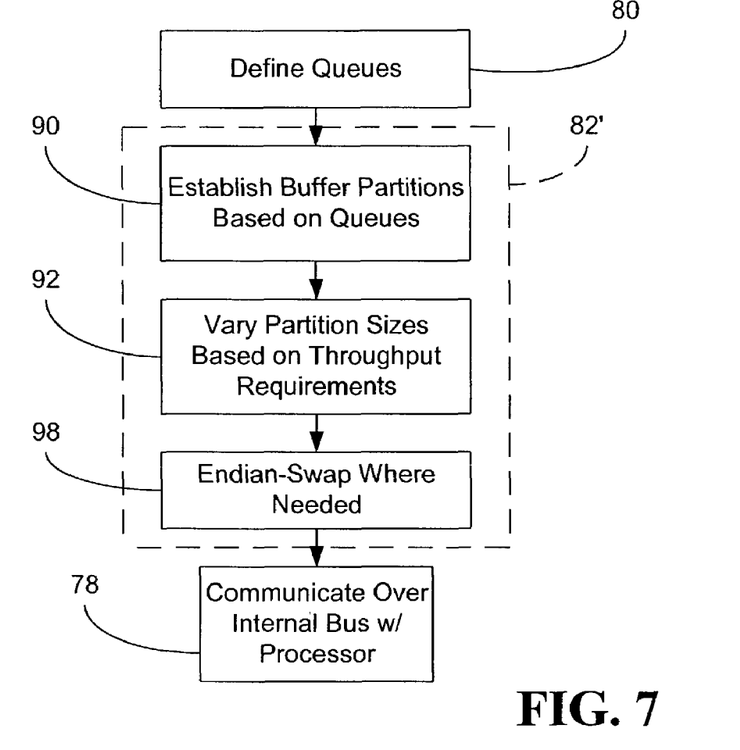
FIG. 7 is a flowchart of an example of a process of aggregating network data in an intermediate memory module in accordance with one embodiment of the invention.
Figure 8:
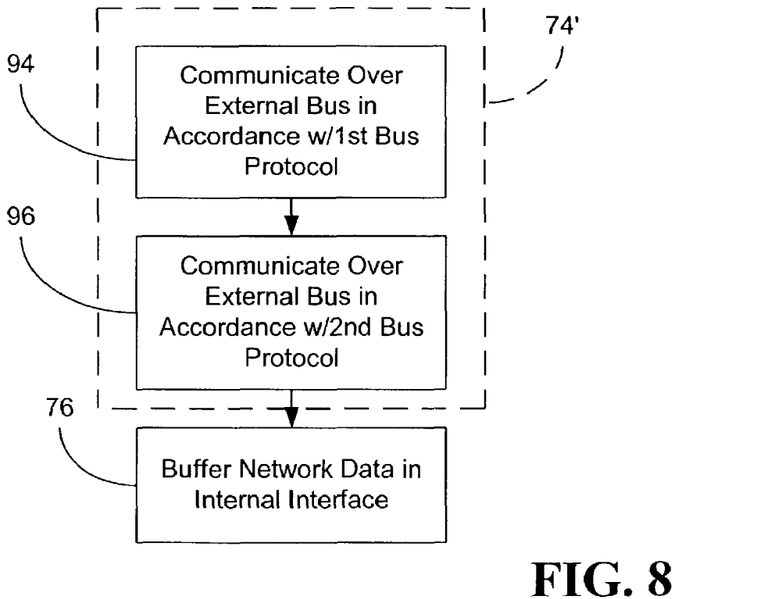
FIG. 8 is a flowchart of a process of communicating over an external bus in accordance with one embodiment of the invention.

Turning now to FIG. 7, one approach to aggregating data in accordance with the plurality of queues is shown in greater detail at block 82'. It can be seen that buffer partitions are established in the intermediate memory module at block 90 based on the queues. Block 92 provides for varying sizes of the partitions based on throughput requirements of the network data. Block 98 provides for endian-swapping where needed. Essentially, the network data is buffered in accordance with a variable bit order (i.e., highest-to-lowest, or lowest-to-highest). Thus, the variable bit order enables the communication over the internal bus to be independent of whether the Utopia bus protocol or the PCI bus protocol is used to communicate over the external bus. FIG. 8 shows one approach to communicating over the external bus in greater detail at block 74'. Block 94 provides for communicating over the external bus with a first external bus interface in accordance with a first bus protocol. Block 96 provides for communicating over the external bus with a second external bus interface in accordance with a second bus protocol.

With continuing reference to FIGS. 1–8, it will be appreciated that all engines can be initialized and programmed through registers. Furthermore, the network interface 26 provides eight distinct logical transmit and receive queues to the external world. The IIE 34 acts as a DMA engine that is responsible for bi-directional data transfer between the internal components of the SOC and the RAM 60 through the internal bus 14. The intermediate memory module 36 is therefore responsible for temporary data storage. The EIE 30 includes DMA engines that are responsible for bi-directional data transfer between the RAM 60 and the external network.

The IIE 34 is designed to support a batch-based compute model within the integrated circuit (IC). A batch-based compute module enables a true overlap of compute with data movement, such that all resources in the processor 12 are used. The IIE 34 is capable of being both a master and a slave on the transport mechanism internal to the SOC. The IIE 34 can transport data received from the network independently to any location within the processor 12, by writing it on the internal bus 14. Data is written to addresses specified by a set of programmable registers 52, 54, and 56. Thus, each queue can transport data to an independent location. Once the data is written, it is handed-off through a hardware-based handshaking mechanism to an agent of the processor 12 inside the SOC. Conversely, when data is to be transmitted to the network, a processing agent inside the SOC hands-off data to the IIE 34. To permit efficient transfer, the IIE 34 is capable of accepting data directly from an external agent by enabling data to be written into the RAM 60. The EIE 30 then transports the data from the RAM 60 to an external interface.

The handoff of data to/from compute engines/processing agents is based on the concept of processing buffers. Each buffer may actually include one or more packets/cells.

Higher aggregation permits better transport and processing efficiency at the cost of additional latency. As already discussed, the location and size of buffers is programmable. In the illustrated example, the network interface 26 is capable of supporting up to eight distinct buffers of data. This enables multiple buffers to be "in-flight" and be processed simultaneously within the processor core. Furthermore, the number of buffers need not be fixed at eight. When each buffer contains multiple packets/cells, logic in the IIE 34 and EIE 30 allows the network interface 26 to keep track of "frames" of data (for example, IP packets, or asynchronous transfer mode—ATM cells) within each buffer, so that framing information provided at the external interface can be maintained inside the processor 12 to assist in data processing. In addition, the registers 52, 54, 56 contain information that tells the engine where to put the data for each of the buffers.

As already discussed, the buffer-based structure enables a batch-compute model within the processor 12, and permits a tradeoff of data transport/processing efficiency against compute latency. The buffer-based structure also permits higher utilization of SOC resources. The multiple queue structure permits different classes of traffic to be handled differently. Furthermore, different classes of traffic can be directed to different locations in the SOC. The multiple queue structure also allows the user to dedicate other SOC resources, such as processor cores, to given queues (with potentially different functions), providing higher efficiency and/or simpler software design. The multi-buffer structure enables multiple buffers of data to be processed simultaneously within the core. It will further be appreciated that the data can be handed-off to any agent at any addressable location. Thus, a single queue structure can be used for multiple categories of traffic, such as control traffic, data traffic and through traffic. The support for framing of data provides the software at the destination end of the transfer with knowledge of the framed boundaries, so that it does not have to parse framed contents to determine these boundaries. The result is a significant savings of compute time. It will be appreciated that across queues, data transport priority can be altered in several ways. The flexible allocation of resources, such as allowing software to configure different sized RAM partitions as well as varying DMA block size and DMA latencies for different queues, can help the user meet strict latency or bandwidth requirements of higher priority channels.

It will further be appreciated that the architecture of the network interface 26 enables interfaces from multiple protocols to be seamlessly supported. The external network may be a standard electrical bus such as a PCI bus. Utopia (Level 1, 2 or 3), POS/PHY, etc. or it may be a proprietary bus. Through multiple external bus interfaces 64, 66, a single network interface (or backplane interface, BIF) implementation may interface to multiple different and independent physical busses. Furthermore, to cope with the varying data ordering mechanisms present in different protocols, each queue is equipped with an independent byte-swapping mechanism.

Typically, the peak throughput of an interface such as the Utopia or PCI interfaces is significantly higher than the average rate at which data is processed inside the SOC. Conversely, there may be periods following traffic bursts during which the network runs "dry". To address this need, the RAM 60 allows the SOC to absorb bursts of data from the network. The data might otherwise be lost. The network interface 26 has a multi-layer mechanism to tolerate errant network traffic characteristics. The RAM 60 acts as a buffer that isolates internal transport latencies from external transport latencies. Short network transients can be absorbed by the RAM 60. The IIE 34 has a hardware-based overflow tolerance mechanism that enables it to buffer data when the SOC experiences a temporary burst of traffic on a network interface on receive, or when the network is congested on transmit. The hardware-based overflow is specified with a state-machine mechanism that is straightforward to implement. Data that overflows is presented with the same look and feel, i.e., in the same buffers to the same locations as the original data. Therefore, the internal software architecture does not need a separate processing flow for overflow data. Conversely, during dry spells, a hardware preempt feature ensures that there is no stale data in the RAM 60. If both these mechanisms fail, for data receive there is a hardware backpressure signal that can be raised across the network interface 26 through the EIE 30. In this case, on transmit the SOC will stall, and on receive the network will stall.

As already discussed, each of the data queues have an independent register set. However, the eight queues share the RAM 60 and transport resources. The partitioning of the resources, across the eight queues, is programmable. These queues may be assigned to different external interfaces and/or to different internal processor cores within the SOC. Resource allocation is flexible between the queues because different queues may be assigned varying partition sizes in the RAM 60, and varying priorities may be assigned to the DMA transfers performed by the IIE 34 or EIE 30. The duration for which the shared resources are occupied when they are acquired is also individually programmable.

An SOC with the network interface 26 can robustly tolerate network misbehavior and preserve data that might otherwise be lost. This is of crucial importance in network processing. The RAM 60 also decouples the latencies of the internal and external bus interfaces. Periods of bursty traffic from the network, temporary network congestion or network dry spells are isolated from the internals of the SOC. The multi-layered data transport architecture minimizes the number of occasions at which the interface will prevent the external network from transferring data and the number of times the SOC stalls in response to network conditions. The network interface 26 allows multiple physical interfaces (such as PCI and Utopia) to present a common electrical and programming interface to internal hardware/software of the SOC. This common interface reduces design time and enables higher design abstraction for both the hardware blocks and the software programs internal to the SOC, compared with other architectures where internal hardware and software interfaces directly to different external buses. New network interfaces can be added without altering the internal architecture of the SOC and with minimal disruption to the internal architecture and design. The resources of the network interface 26, and as such the resources of the entire SOC, can be seamlessly shared across the multiple external protocol interfaces in a variety of configurations.

The network interface 26 provides the design flexibility and performance level necessary to meet the needs of a competitive and demanding market. Multi-processor environments in which a number of applications simultaneously communicate with external platforms can make use of the unique ability to allocate resources to individual and independent queues. Furthermore, by enabling multiple protocols to be incorporated into the design "on-the-fly", the network interface 26 provides a powerful mechanism for maximizing queue efficiency.

Those skilled in the art can now appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A network interface to be coupled between a processor internal bus and an external bus architecture having one or more external buses, the network interface comprising:
   an external interface engine coupled to the external bus architecture, the external interface engine to communicate over the external bus architecture in accordance with one or more bus protocols; and
   an internal interface coupled to the external interface engine and the internal bus, the internal interface including an internal interface engine and an intermediate memory module coupled to the internal interface engine, the internal interface engine to define a plurality of queues for the network data and to buffer network data between the internal bus and the external bus architecture along specific logical partitions based on the plurality of queues.

2. The network interface of claim 1 wherein the internal interface engine includes:
   a multi-channel register structure coupled to the external interface engine and the intermediate memory module;
   an internal bus interface architecture coupled to the internal bus; and
   a direct memory access (DMA) engine architecture coupled to the internal bus interface architecture and the intermediate memory module, the DMA engine architecture to enable the internal bus interface architecture to transport the network data directly between the intermediate memory module and a plurality of 1 locations via the internal bus.

3. The network interface of claim 2 wherein the DMA engine architecture includes:
   a master DMA engine; and
   a slave DMA engine.

4. The network interface of claim 3 wherein the master DMA engine is coupled to the multi-channel register structure, the master DMA engine to receive queue priority data and DMA setup information from the register structure.

5. The network interface of claim 2 wherein the internal bus interface architecture includes:
   an internal bus master interface;
   an internal bus slave interface; and
   a plurality of local control registers coupled to the internal bus slave interface, the local control registers to store data regarding the plurality of addressable locations.

6. The network interface of claim 2 wherein the multi-channel register structure includes:
   a set of receive registers coupled to the external interface engine and the intermediate memory module;
   a set of transmit registers coupled to the external interface engine and the intermediate memory module; and
   control logic coupled to the receive and transmit registers to prioritize the queues and define DMA setup information for the network data.

7. The network interface of claim 2 wherein the intermediate memory module includes:
   a random access memory (RAM); and
   a RAM controller coupled to the RAM, the external interface engine and the internal interface engine, the RAM controller to establish the logical partitions based on the queues defined by the internal interface engine.

8. The network interface of claim 7 wherein the logical partitions are variable.

9. The network interface of claim 7 wherein the RAM controller is to use a hardware-based dry spell mechanism to prevent network dry spells from abandoning network data in the RAM.

10. The network interface of claim 7 wherein the RAM controller is to use a hardware-based overflow mechanism to prevent network bursts from causing network data to be dropped by the RAM.

11. The network interface of claim 1 wherein the queues are to transport the network data independently of one another.

12. The network interface of claim 1 wherein the network data includes packets, the internal interface to buffer the packets based on a batch-based processing model.

13. The network interface of claim 12 wherein the internal interface frames the packets.

14. The network interface of claim 1 wherein the external interface engine includes:
   a first external bus interface to communicate over the external bus architecture in accordance with a first bus protocol; and
   a second external bus interface to communicate over the external bus architecture in accordance with a second bus protocol.

15. The network interface of claim 14 wherein the first external bus interface includes a first external direct memory access (DMA) engine.

16. The network interface of claim 14 wherein the second external bus interface includes a second external direct memory access (DMA) engine.

17. An internal interface to be disposed between an external interface engine of a network interface and an internal bus, the internal interface comprising:
   an internal interface engine coupled to the internal bus, the internal interface engine to define a plurality of queues for network data; and
   an intermediate memory module coupled to the internal interface engine and the external interface engine, the intermediate memory module to aggregate the network data along logical partitions in accordance with the plurality of queues.

18. The internal interface of claim 17 wherein the internal interface engine includes:
   a multi-channel register structure coupled to the external interface engine and the intermediate memory module;
   an internal bus interface architecture coupled to the internal bus; and
   a direct memory access (DMA) engine architecture coupled to the internal bus interface and the intermediate memory module, the DMA engine architecture to enable the internal bus interface architecture to transport the network data directly between the intermediate memory module and a plurality of addressable locations via the internal bus.

19. The internal interface of claim 18 wherein at least one of the addressable locations is part of a processor, the processor being coupled to the internal bus.

20. The internal interface of claim 19 wherein the internal bus interface architecture is to communicate with the processor coupled to the internal bus in accordance with a processor handoff protocol.

21. The internal interface of claim 17 wherein the intermediate memory module includes:

a random access memory (RAM); and a RAM controller coupled to the RAM, the external interface engine and the internal interface engine, the RAM controller to establish the logical partitions based on the queues defined by the internal interface engine.

22. The internal interface of claim 21 wherein the logical partitions are variable.

23. A network interface between an internal bus and an external bus architecture having one or more external buses, the network interface comprising:

an external interface engine having a first external bus interface to communicate over the external bus architecture in accordance with a first bus protocol and a second external bus interface to communicate over the external bus architecture in accordance with a second bus protocol;

a random access memory (RAM);

a RAM controller coupled to the RAM and the external interface engine, the RAM controller to establish buffer partitions based on a plurality of queues;

a multi-channel register structure coupled to the first external bus interface, the second external bus interface and the RAM controller, the register structure to generate queue data where the queue data defines the plurality of queues;

an internal bus interface architecture coupled to the internal bus;

a direct memory access (DMA) engine architecture coupled to the internal bus interface architecture and the RAM controller, the DMA engine architecture to enable the internal bus interface architecture to transport network data directly between the RAM and a plurality of addressable locations via the internal bus.

24. The network interface of claim 23 wherein at least one of the addressable locations is part of an on-chip memory of a processor, the processor being coupled to the internal bus.

25. The network interface of claim 24 wherein the internal bus interface architecture is to communicate with the processor in accordance with a processor handoff protocol.

26. A method of supporting transfer of network data between a processor internal bus and an external bus architecture having one or more external buses, the method comprising:

communicating over the external bus architecture in accordance with one or more bus protocols;

buffering network data between the internal bus and the external bus architecture in an internal interface by defining a plurality of queues for the network data and aggregating the network data in an intermediate memory module in accordance with the plurality of queues along logical partitions; and communicating over the internal bus with the processor in accordance with a processor handoff protocol.

27. The method of claim 26 further including enabling internal interface to transport the network data directly between the intermediate memory module and a plurality of addressable locations via the internal bus.

28. The meted of claim 26 further including:

assigning each queue to a predetermined class of network data; and defining a transmission priority for each predetermined class.

29. The method of claim 26 further including establishing the logical partitions in the intermediate memory module based on the queues.

30. The method of claim 29 further including varying sizes of the partitions based on throughput requirements of the network data.

31. The method of claim 26 further including:

communicating over the external bus architecture with a first external bus interface in accordance with a first bus protocol; and communicating over the external bus architecture with a second external bus interface in accordance with a second bus protocol.

32. The method of claim 26 further including buffering the network data in accordance with a variable bit or byte order, the variable bit or byte order enabling the communication over the internal bus to be independent of whether the first bus protocol or the second bus protocol is used to communicate over the external bus architecture.

33. A machine readable medium storing a set of instructions capable of being executed by a processor to:

communicate over an external bus architecture in accordance with one or more bus protocols;

buffer network data between an internal bus and the external bus architecture in an internal interface by defining a plurality of queues for the network data and aggregating the network data along logical partitions in an intermediate memory module in accordance with the plurality of queues; and communicate over the internal bus with a processor in accordance with a processor handoff protocol.

34. The medium of claim 33 wherein the instructions are further capable of being executed to enable the internal interface to transport the network data directly between the intermediate memory module and a plurality of addressable locations via the internal bus.

35. The medium of claim 33 wherein the instructions are further capable of being executed to:

assign each queue to a predetermined class of network data; and define a transmission priority for each predetermined class.

36. A networking architecture comprising:

a processor, having an internal bus;

an external bus architecture having one or more external busses; and a network interface between the internal bus and the external bus architecture, the network interface including an external interface engine coupled to the external bus architecture, the external interface engine to communicate over the external bus a architecture in accordance with one or more bus protocols, the network interface further including an internal interface coupled to the external interface engine and the internal bus, the internal interface to buffer network data between the internal bus and the external bus architecture along specific logical partitions based on queues defined in the internal interface.

37. The architecture of claim 36 comprising:

an internal interface engine coupled to the internal bus, the 1 interface engine to define a plurality of queues for the network data; and an intermediate memory module coupled to the internal interface engine and the external interface engine, the intermediate memory module to aggregate the network data in accordance with the plurality of queues.

38. A network interface to be coupled between a processor internal bus and an external bus architecture having one or more external buses, the network interface comprising:

an external interface engine coupled to the external bus architecture, the external interface engine to communicate over the external bus architecture in accordance with one or more bus protocols; and an internal interface coupled to the external interface engine and the internal bus, the internal interface to buffer network data between the internal bus and the external bus architecture, the internal interface including an internal interface engine and an intermediate memory module, the intermediate memory module to aggregate the network data in accordance with a plurality of queues, the internal interface engine having a direct memory access to enable the internal interface engine to transport the network data directly between the intermediate memory module and a plurality of addressable locations via the internal processor bus.

* * * * *

UNITED STATES PATENT AND TRADEMARK OFFICE
CERTIFICATE OF CORRECTION

PATENT NO. : 7,162,564 B2 Page 1 of 1
APPLICATION NO. : 10/190851
DATED : January 9, 2007
INVENTOR(S) : Vinnakota et al.

It is certified that error appears in the above-identified patent and that said Letters Patent is hereby corrected as shown below:

In column 9, at line 37, delete "1" and insert --addressable--.

In column 12, at line 59, delete "1" and insert --internal--.

Signed and Sealed this

Twenty Second Day of April, 2008

JON W. DUDAS
*Director of the United States Patent and Trademark Office*